United States Patent
Ishii

(10) Patent No.: US 12,539,781 B2
(45) Date of Patent: Feb. 3, 2026

(54) MANAGEMENT DEVICE AND POWER SUPPLY SYSTEM

(71) Applicant: Panasonic Intellectual Property Management Co., Ltd., Osaka (JP)

(72) Inventor: Yohei Ishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1072 days.

(21) Appl. No.: 17/623,523

(22) PCT Filed: Jun. 24, 2020

(86) PCT No.: PCT/JP2020/024754
§ 371 (c)(1),
(2) Date: Dec. 28, 2021

(87) PCT Pub. No.: WO2021/010113
PCT Pub. Date: Jan. 21, 2021

(65) Prior Publication Data
US 2022/0355700 A1    Nov. 10, 2022

(30) Foreign Application Priority Data
Jul. 18, 2019    (JP) .................................. 2019-132527

(51) Int. Cl.
*B60L 53/62*    (2019.01)
*B60L 58/13*    (2019.01)
*H02J 7/00*    (2006.01)

(52) U.S. Cl.
CPC ............... *B60L 53/62* (2019.02); *B60L 58/13* (2019.02); *H02J 7/0013* (2013.01);
(Continued)

(58) Field of Classification Search
CPC ......... B60L 2240/547; B60L 2240/549; B60L 58/10; B60L 58/12; B60L 58/16;
(Continued)

(56) References Cited

U.S. PATENT DOCUMENTS

2010/0244846 A1*  9/2010  Desprez ............... G01R 31/392
                                                                324/427
2014/0062409 A1*  3/2014  Endo ................... H02J 7/00308
                                                                320/126
(Continued)

FOREIGN PATENT DOCUMENTS

JP    2018-129190    8/2018
WO    2019/049571    3/2019

OTHER PUBLICATIONS

International Search Report of PCT application No. PCT/JP2020/024754 dated Aug. 25, 2020.

*Primary Examiner* — Julian D Huffman
*Assistant Examiner* — Johali A Torres Ruiz
(74) *Attorney, Agent, or Firm* — Rimon P.C.

(57) ABSTRACT

In a management device that manages a parallel system for power storage where a plurality of series-connected cell groups are connected in parallel, controller (16) derives deviations of currents flowing through the plurality of series-connected cell groups, and calculates an upper limit value of a charging current or charging power of the whole parallel system or an upper limit value of a discharging current or discharging power of the whole parallel system based on the derived current deviations. Controller (16) adjusts the upper limit value by multiplying the upper limit value by a coefficient α ($0 \leq \alpha \leq 1$) in accordance with a condition at a time of deriving the current deviations.

14 Claims, 4 Drawing Sheets

(52) U.S. Cl.
CPC .......... *H02J 7/0048* (2020.01); *H02J 7/0063* (2013.01); *H02J 7/00716* (2020.01)

(58) Field of Classification Search
CPC ....... H01M 2010/4271; H01M 2220/20; H02J 7/02; H02J 7/04; H02J 7/007; Y02E 60/10; Y02T 10/70; Y02T 10/7072; Y02T 90/12
See application file for complete search history.

(56) References Cited

U.S. PATENT DOCUMENTS

| | | | | |
|---|---|---|---|---|
| 2014/0139189 | A1* | 5/2014 | Izumi | H02J 7/0048 320/134 |
| 2015/0280466 | A1* | 10/2015 | Owen | B60L 50/51 320/137 |
| 2015/0338466 | A1* | 11/2015 | Wu | G01R 31/389 320/126 |
| 2016/0169977 | A1* | 6/2016 | Fukuhara | G01R 31/3646 324/434 |
| 2017/0070069 | A1* | 3/2017 | Li | H02J 7/0044 |
| 2017/0334425 | A1* | 11/2017 | Kato | B60W 20/11 |
| 2018/0045788 | A1* | 2/2018 | Kawai | H01M 10/4285 |
| 2018/0292462 | A1* | 10/2018 | Itabashi | H01M 10/441 |
| 2020/0176829 | A1 | 6/2020 | Nishikawa et al. | |

* cited by examiner

FIG. 3

| Item | Condition | Reliability |
|---|---|---|
| Prediction method | Estimate internal states | 0.95 |
| SOH | 90%<SOH | 1.00 |
| SOH | 80%<SOH<90% | 0.95 |
| SOH | SOH<80% | 0.90 |
| Minimum temperature | 5°C<T | 1.00 |
| Minimum temperature | 0°C<T<5°C | 0.90 |
| Minimum temperature | T<0°C | 0.80 |
| SOC | 95%<SOC | 0.95 |
| SOC | 10%<SOC<95% | 1.00 |
| SOC | SOC<10% | 0.95 |

FIG. 4

| Item | Condition | Reliability |
|---|---|---|
| Prediction method | Measured battery value | 1.00 |
| Current value | 50A<I | 1.00 |
| | 5A<I<50A | 0.95 |
| | I<5A | 0.90 |
| Current change | 0.8<ΔI | 0.80 |
| | 0.5<ΔI<0.8 | 0.90 |
| | ΔI<0.5 | 1.00 |
| SOH | 90%<SOH | 1.00 |
| | 80%<SOH<90% | 0.95 |
| | SOH<80% | 0.90 |
| Minimum temperature | 5°C<T | 1.00 |
| | 0°C<T<5°C | 0.90 |
| | T<0°C | 0.80 |

MANAGEMENT DEVICE AND POWER SUPPLY SYSTEM

TECHNICAL FIELD

The present invention relates to a management device that manages a parallel system for power storage where a plurality of series-connected cell groups are connected in parallel, and a power supply system.

BACKGROUND ART

In recent years, hybrid vehicles (HVs), plug-in hybrid vehicles (PHVs), and electric vehicles (EVs) have become widespread. These electric vehicles are each equipped with a secondary battery as a key device.

In order to increase a capacity of a battery, there has been proposed a parallel system where a plurality of battery modules are connected in parallel. Each battery module includes a plurality of cells connected in series. There may be a case where, even in a case where the cells included in such respective battery modules connected in parallel are the same type and are equal in number, such battery modules connected in parallel differ from each other in an internal resistance of cells because of potential difference, capacity difference, temperature difference or the like between the cells. In this case, a resistance difference occurs between the battery modules and hence, current irregularity occurs between the battery modules. When the current irregularity occurs between the battery modules, a current concentrates on a specific battery module. Accordingly, there exists a possibility that the currents exceed the maximum allowable current of the battery module.

On the other hand, with respect to a battery system where battery modules are connected in parallel, there has been proposed a method where a current deviation is calculated using an internal resistance before charging or discharging is started and using a measurement value of the current after charging or discharging is started, and an upper limit power of the whole battery system is set such that the upper limit power of the whole battery system does not exceed an upper limit current of each battery module (see, PTL 1, for example). Further, with respect to secondary batteries connected in parallel, there has been proposed a method where a maximum current is estimated among currents flowing in a distributed manner in secondary batteries connected in parallel by taking into account a resistance irregularity and an open circuit voltage (OCV) difference between the secondary batteries (see PTL 2, for example).

CITATION LIST

Patent Literatures

PTL 1: WO2019/049571
PTL 2: Unexamined Japanese Patent Publication No. 2018-129190

SUMMARY OF THE INVENTION

However, it is difficult to constantly estimate, with high accuracy, an internal state of a battery by using an internal resistance and an OCV. In addition, even in a case where a measurement value of a current is used, when a current that flows through the whole system where the parallel connection is adopted is small, the estimation of an internal state of a battery is largely influenced by a measurement error of a current sensor. Further, in a case where a change in a current is extremely large, the estimation of an internal state of a battery is influenced by a delay in a response time in a measurement system. Particularly, in an application where batteries are mounted on a vehicle, there is a case where a current largely changes in a short time.

In a case where the prediction of a current deviation between batteries that are connected in parallel contains an error, even when charging and discharging are performed within a range of an upper limit value of a whole parallel system, there is a possibility that a current that exceeds a maximum allowable current flows through a specific series-connected module that forms a part of a whole parallel system where batteries are connected in parallel.

The present disclosure has been made in view of such circumstances, and it is an object of the present disclosure to provide a technique capable of maintaining an upper limit value of a current or power of a whole parallel system as high as possible while preventing a current exceeding a maximum allowable current from flowing through respective series-connected modules that form the parallel system.

To solve such problems, according to an aspect of the present disclosure, there is provided a management device that manages a parallel system for power storage where a plurality of series-connected cell groups are connected in parallel, the management device including: a measurement unit that measures voltages, currents, and temperatures of cells in the parallel system; and a controller configured to derive deviations of currents flowing through the plurality of series-connected cell groups, and configured to calculate an upper limit value of a charging current or charging power of the whole parallel system or an upper limit value of a discharging current or discharging power of the whole parallel system based on the derived current deviations. The controller is configured to adjust the upper limit value by multiplying the upper limit value by a coefficient $\alpha$ ($0 \leq \alpha \leq 1$) in accordance with a condition at the time of deriving the current deviations.

An arbitrary combination of the above constituents and a conversion of the expressions of the present disclosure among a method, an apparatus, a system, and the like are also effective as an aspect of the present invention.

According to the present disclosure, it is possible to maintain an upper limit value of a current or power of the whole parallel system as high as possible while preventing a current that exceeds a maximum allowable current from flowing through respective series-connected modules that form the parallel system.

BRIEF DESCRIPTION OF DRAWINGS

FIG. 3 is a diagram illustrating an example of a table used for calculation of a coefficient $\alpha$ in a case where a current deviation is estimated based on an internal state of a cell.

FIG. 4 is a diagram illustrating an example of a table used for calculation of a coefficient $\alpha$ in a case where a current deviation is derived from a measured current value.

DESCRIPTION OF EMBODIMENT

Figure 1:
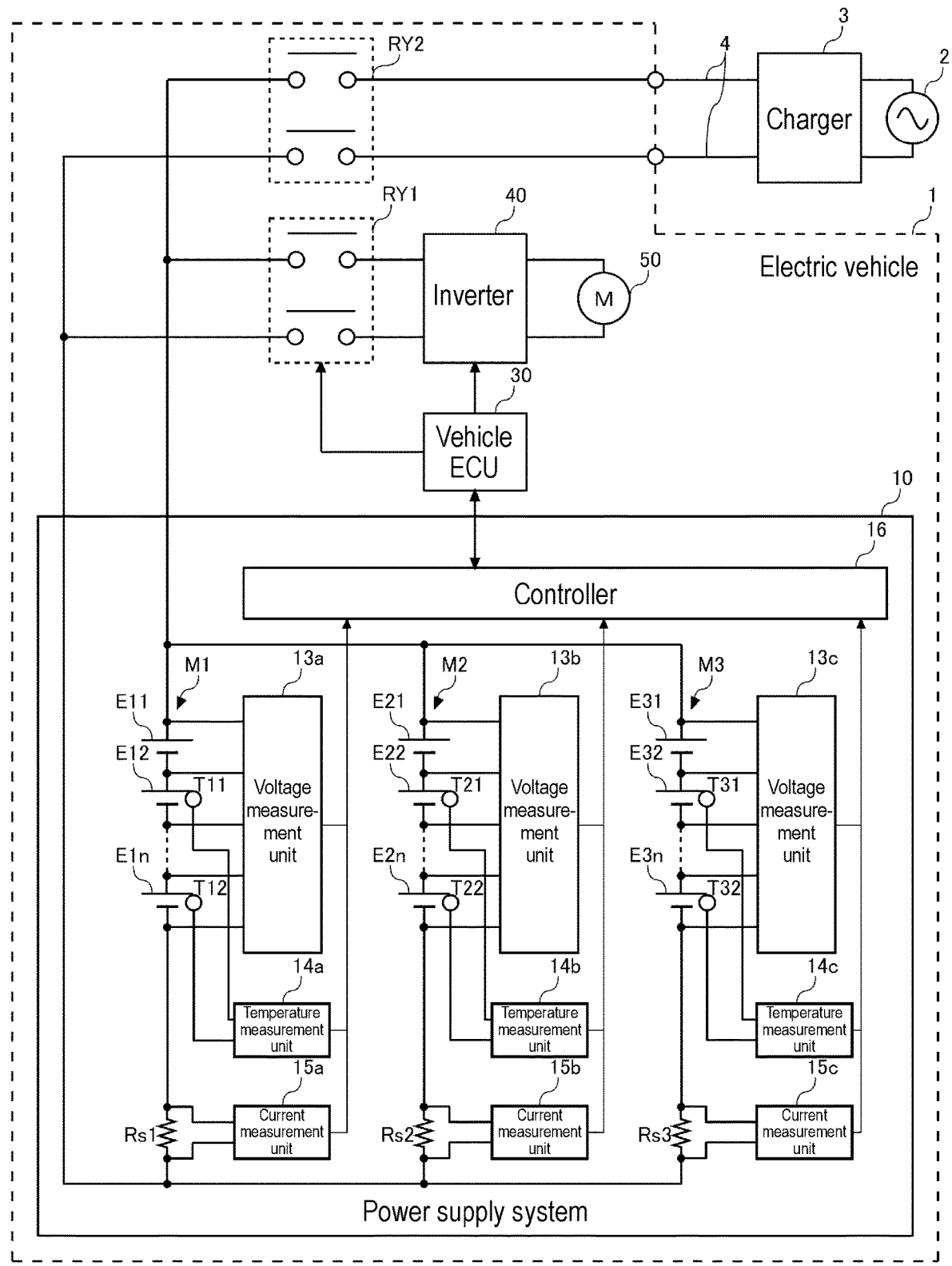
FIG. 1 is a view illustrating an electric vehicle equipped with a power supply system according to an exemplary embodiment.

FIG. 1 is a view illustrating electric vehicle 1 equipped with power supply system 10 according to an exemplary embodiment of the present invention. It is assumed that electric vehicle 1 is an electric vehicle (EV) that can be charged from charger 3 installed outside electric vehicle 1.

Power supply system 10 is connected to motor 50 via first relay RY1 and inverter 40. Inverter 40 converts DC power supplied from power supply system 10 into AC power and supplies the AC power to motor 50 during power running. Inverter 40 converts the AC power supplied from motor 50 into DC power, and supplies the DC power to power supply system 10 during regeneration. Motor 50 is a three-phase AC motor, and rotates in accordance with the AC power supplied from inverter 40 during the power running. During the regeneration, rotation energy generated by deceleration is converted into the AC power, and the AC power is supplied to inverter 40.

Vehicle ECU 30 controls whole electric vehicle 1. Vehicle ECU 30 may be formed of, for example, an integrated vehicle control module (VCM). First relay RY1 is a contactor inserted between wiring connecting power supply system 10 and inverter 40. Vehicle electronic control unit (ECU) 30 controls first relay RY1 in an on-state (closed state) during traveling, and electrically connects power supply system 10 and a power system of electric vehicle 1. During non-traveling in principle, vehicle ECU 30 controls first relay RY1 in an off-state (open state) so as to interrupt the electrical connection between power supply system 10 and the power system of electric vehicle 1. Instead of the relay, another type of switch such as a semiconductor switch may be used.

Power supply system 10 can be charged from commercial power system 2 when power supply system 10 is connected to charger 3 installed outside electric vehicle 1 by charging cable 4. Charger 3 is installed in homes, car dealers, service areas, commercial facilities, public facilities, and the like. Charger 3 is connected to commercial power system 2 and charges power supply system 10 in electric vehicle 1 via charging cable 4. In electric vehicle 1, second relay RY2 is mounted on wiring connecting power supply system 10 and charger 3. Instead of the relay, another type of switch such as a semiconductor switch may be used. Vehicle ECU 30 controls second relay RY2 so as to bring second relay RY2 into an on-state (closed state) before charging is started, and into an off-state (open state) after the charging is completed.

In general, normal charging uses an alternating current for charging, and quick charging uses a direct current for charging. In a case where an alternating current is used for charging, AC power is converted into DC power by an AC/DC converter (not illustrated) connected between second relay RY2 and power supply system 10.

Power supply system 10 includes: a plurality of series-connected modules M1 to M3 connected in parallel; and a management device that manages the plurality of series-connected modules M1 to M3. The management device is a general term for components of a control system that manages the plurality of series-connected modules M1 to M3. In the present embodiment, the management device includes voltage measurement units 13a to 13c, temperature measurement units 14a to 14c, current measurement units 15a to 15c, and controller 16.

Series-connected module M1 includes a plurality of cells E11 to E1n that are connected in series, series-connected module M2 includes a plurality of cells E21 to E2n that are connected in series, and series-connected module M3 includes cells E31 to E3n that are connected in series. As the cell, a lithium ion battery cell, a nickel hydride battery, a lead battery cell, an electric double layer capacitor cell, a lithium ion capacitor cell, or the like can be used. Hereinafter, in this specification, an example is considered where a lithium-ion battery cell (nominal voltage: 3.6 V to 3.7 V) is used.

The number of cells connected in series in each series-connected module is determined in accordance with a drive voltage of motor 50. For example, power supply system 10 may be formed of a high-voltage power supply system of 400 V or more or may be formed of a low-voltage power supply system of less than 60 V. The number of series-connected modules connected in parallel is determined in accordance with a required capacity of electric vehicle 1. FIG. 1 illustrates an example where three series-connected modules M1, M2, M3 are connected in parallel. However, the present invention is not limited to the case where three series-connected modules are connected in parallel. The larger number of series-connected modules may be connected in parallel so as to extend a millage.

Voltage measurement units 13a to 13c, temperature measurement units 14a to 14c, current measurement units 15a to 15c, and controller 16 that form the management device may be mounted on one control board or may be mounted on a plurality of control boards. For example, a control board may be provided for each series-connected module, and voltage measurement unit 13, temperature measurement unit 14, and current measurement unit 15 may be mounted on each control board. Controller 16 may be mounted on a control board different from the above-mentioned control boards, or may be mounted on any one of the above-mentioned control boards. The controller may be mounted on the control board of each series-connected module. For example, in a case where the series-connected module and the control board are housed in a detachable portable battery pack, the controller is mounted on the control board of each battery pack. In this case, a controller that controls the whole battery packs connected in parallel is mounted, and the controller performs a comprehensive control based on information collected from the respective battery packs.

Shunt resistor Rs1 is connected in series with the plurality of cells E11 to E1n that form first series-connected module M1. Shunt resistor Rs1 functions as a current detection element. A Hall element may be used instead of shunt resistor Rs1. A plurality of temperature sensors T11, T12 that detects temperatures of the plurality of cells E11 to E1n are disposed in first series-connected module M1. One temperature sensor may be disposed in first series-connected module M1, or a plurality of temperature sensors may be disposed in first series-connected module M1. For example, a thermistor can be used as temperature sensors T11, T12.

A plurality of voltage measurement lines are connected between nodes of the plurality of cells E11 to E1n connected in series and voltage measurement unit 13a. Voltage measurement unit 13a measures voltages of respective cells E11 to E1n by measuring a voltage between each two adjacent voltage lines. Voltage measurement unit 13a transmits the measured voltages of cells E11 to E1n to controller 16 via a communication line.

Voltage measurement unit 13a can be formed of an application specific integrated circuit (ASIC) or a general-purpose analog front-end IC. Voltage measurement unit 13a includes a multiplexer, an A/D converter, and a communication circuit. The multiplexer outputs the voltage between each two adjacent voltage lines to the A/D converter in order from the top. The A/D converter converts an analog voltage inputted from the multiplexer into a digital value. The communication circuit transmits the converted digital values to controller 16 via the communication line.

Temperature measurement unit 14a includes a voltage dividing resistor, an A/D converter, and a communication circuit. The A/D converter sequentially converts a plurality of analog voltages obtained by division using the plurality of temperature sensors T1, T2 and the plurality of voltage dividing resistors into digital values. The communication circuit transmits the converted digital values to controller 16 via the communication line. Controller 16 estimates the temperatures of the plurality of cells E11 to E1$n$ based on the digital values. For example, controller 16 estimates the temperature of each of cells E11 to E1$n$ based on a value measured by temperature sensors T11, T12 most adjacent to each of cells E11 to E1$n$.

Current measurement unit 15 includes a differential amplifier, an A/D converter, and a communication circuit. The differential amplifier amplifies a voltage across shunt resistor Rs1, and outputs the amplified voltage to the A/D converter. The A/D converter converts an analog voltage inputted from the differential amplifier into a digital value. The communication circuit transmits the converted digital values to controller 16 via the communication line. Controller 16 estimates a current flowing through first series-connected module M1 based on the digital value.

Voltages, temperatures, and currents of cells E21 to E2$n$ of second series-connected module M2 and voltages, temperatures, and currents of cells E31 to E3$n$ of third series-connected module M3 are also measured similarly to the voltages, temperatures, and currents of cells E11 to E1$n$ of first series-connected module M1, and are transmitted to controller 16.

Controller 16 can be formed of a microcomputer and a nonvolatile memory (for example, an electrically erasable programmable read-only memory (EEPROM) or a flash memory). In-vehicle network is connected between controller 16 and vehicle ECU 30. For example, a controller area network (CAN) or a local interconnect network (LIN) can be used as the in-vehicle network.

Controller 16 manages the states of the plurality of cells E11 to E1$n$, E21 to E2$n$, and E31 to E3$n$ based on the voltages, temperatures, and currents of the plurality of cells E11 to E1$n$, E21 to E2$n$, and E31 to E3$n$ measured by voltage measurement units 13$a$ to 13$c$, temperature measurement units 14$a$ to 14$c$, and current measurement units 15$a$ to 15$c$.

Controller 16 estimates a state of charge (SOC) and a state of health (SOH) of each of the plurality of cells E11 to E1$n$, E21 to E2$n$, and E31 to E3$n$. Controller 16 estimates the SOC by combining an open circuit voltage (OCV) method and a current integration method. The OCV method is a method of estimating the SOC based on the OCV of respective cells E11 to E1$n$, E21 to E2$n$, and E31 to E3$n$ measured by voltage measurement unit 13$a$ to 13$c$ and SOC-OCV curves. The current integration method is a method of estimating the SOC based on the OCV at the time of starting charging and discharging of each of cells E11 to E1$n$, E21 to E2$n$, and E31 to E3$n$ and integrated values of currents measured by current measurement units 15$a$ to 15$c$. In the current integration method, measurement errors of current measurement units 15$a$ to 15$c$ are accumulated as a charging time or a discharging time becomes longer. Thus, the estimated SOC by the current integration method needs to be corrected using the estimated SOC by the OCV method.

The SOH is defined by a ratio of a current full charge capacity (FCC) to an initial FCC. It indicates that the lower a numerical value of the SOH (the closer the numerical value to 0%), the larger the degradation of the cell is progressed. The SOH may be obtained by measuring a capacity through full charging or discharging, or may be obtained by summing up storage degradation and cycle degradation. The storage degradation can be estimated based on an SOC, a temperature, and a storage degradation rate. The cycle degradation can be estimated based on an SOC range, a temperature, a current rate, and a cycle degradation rate in use. The storage degradation rate and the cycle degradation rate can be derived in advance by experiments or simulations. The SOC, the temperature, the SOC range, and the current rate can be acquired by measurement.

The SOH can also be estimated based on a correlation between the SOH and the internal resistance of each of the cells. The internal resistance of the cell can be calculated by dividing a voltage drop when a predetermined current is made to flow through the cell for a predetermined time by a current value of the current. The internal resistance of the cell can also be estimated by looking up a map where a relationship between the internal resistance of the cell obtained in advance by an experiment or simulation and a combination of the SOC, the temperature, and the SOH is described. The internal resistance and the SOH of the cell basically have a relationship that the higher the temperature of the cell becomes, the smaller the SOH becomes.

Controller 16 measures a current flowing through the whole parallel system formed of the plurality of series-connected modules M1 to M3. The current that flows through the whole parallel system may be obtained by summing up measured values of the currents flowing through series-connected modules M1 to M3. Alternatively, a current sensor may be provided to a current path after discharging currents are combined (before a charging current is branched), and a value measured by the current sensor may be used.

Controller 16 derives deviations of currents flowing through the plurality of series-connected modules M1 to M3, and calculates an upper limit value of a charging current and an upper limit value of a discharging current of the whole parallel system based on the derived current deviations. Instead of an upper limit value of a charging current and an upper limit value of a discharging current, an upper limit value of charging power and an upper limit value of discharging power may be calculated. Controller 16 derives the current deviations based on the prediction from internal states of the plurality of series-connected modules M1 to M3 or from measurement values of currents flowing through the plurality of series-connected modules M1 to M3. The present disclosure is described specifically hereinafter.

Controller 16 determines a discharging state of power (SOP) and a charging SOP of the series-connected module. The discharging SOP of the series-connected module indicates the maximum power that can be discharged from the series-connected module, and the charging SOP of the series-connected module indicates the maximum power that can be charged to the series-connected module. The discharging SOP becomes zero when the series-connected module reaches a lower limit voltage, and the charging SOP becomes zero when the series-connected module reaches an upper limit voltage.

The SOP can be estimated by looking up a table where a relationship between an SOC and an SOP that is obtained in advance by an experiment or a simulation is described. The SOP decreases as the SOH decreases. Accordingly, a current SOP can be estimated by multiplying an initial SOP that is specified by looking up the table by a current SOH.

The SOP of the series-connected module may be simply treated as equal to the maximum rated power of series-connected module M1. In this case, the discharging SOP of the series-connected module at the end of discharging (SOC=0%) is set to 0 in the series-connected module that forms a single unit. Then, for example, at a point of time that SOC becomes 2% (SOC=2%), the discharging SOP is returned to a value equal to the maximum rated power of the series-connected module. Further, the charging SOP of the series-connected module at the time of full charge (SOC=100%) is set to 0, then, for example, at a point of time that the SOC becomes 98% (SOC=98%), the charging SOP of the series-connected module is returned to a value equal to the maximum rated power of the series-connected module. In a case where the charging method is a pseudo CC/CV method, the charging SOP may be decreased to a smaller value from the maximum rated power of the series-connected module.

Controller 16 calculates: a discharging SOP of the whole plurality of series-connected modules M1 to M3 connected in parallel (hereinafter, referred to as a discharging system SOP); and a charging SOP of the whole plurality of series-connected modules M1 to M3 (hereinafter, referred to as a charging system SOP). If the SOP between the plurality of series-connected modules M1 and M3 and the current value between the plurality of series-connected modules M1 and M3 are ideally equal, the system SOP becomes a value obtained by multiplying the module SOP by the number of parallel connections (3 in the example shown in FIG. 1). On the other hand, the larger the current deviations between the plurality of series-connected modules M1 to M3, the lower the system SOP becomes.

Accordingly, the system SOP can be calculated by the following equations (Equation 1 to Equation 4).

Discharging system SOP=min(discharging system SOP$n$)   (Equation 1)

Discharging system SOP$n$=discharging module SOP$n$×$I$/$In$   (Equation 2)

Charging system SOP=min(charging system SOP$n$)   (Equation 3)

Charging system SOP$n$=charging module SOP$n$×$I$/$In$   (Equation 4)

In the equation, In indicates a current flowing through an n-th series-connected module, I indicates the sum of currents flowing through the plurality of series-connected modules connected in parallel (system current).

In the calculation of the discharging system SOP and the charging system SOP, values of currents flowing through the respective series-connected modules M1 to M3 are necessary. In a state where power supply system 10 is not charged or discharged, the values of the currents flowing through respective series-connected modules M1 to M3 cannot be measured. In that case, it is necessary to predict the current deviations from the internal states of respective series-connected modules M1 to M3.

For each series-connected module, controller 16 estimates the internal resistance of the series-connected module by combining the internal resistances of the plurality of cells included in the series-connected module, and estimates the OCV of the series-connected module by combining the OCVs of the plurality of cells included in the series-connected module. Controller 16 predicts the current flowing through each series-connected module based on the internal resistance and the OCVs of respective series-connected modules M1 to M3.

The currents predicted to flow through the respective series-connected modules can be calculated by solving simultaneous equations described in the following equations (Equation 5 to Equation 7) described below. In the following equations (Equation 5 to Equation 7), the number of series-connected modules connected in parallel is set to m. When no current flows, OCV1, OCV2, OCV3, . . . , and OCVm of the respective series-connected module and internal resistances R1, R2, R3, Rm of the respective series-connected modules are known. On the other hand, voltages V1, V2, V3, . . . , and Vm of the respective series-connected modules and currents I1, I2, I3, . . . and Im flowing through the respective series-connected modules are unknown.

$V1=OCV1+I1\times R1, V2=OCV2+I2\times R2, V3=OCV3+I3\times R3, \ldots ,Vm=OCVm+Im\times Rm$   (Equation 5)

$V1=V2=V3 \ldots =Vm$   (Equation 6)

$I=I1+I2+I3 \ldots +Im$   (Equation 7)

By solving the simultaneous equations described in (Equation 5) to (Equation 7) described above, currents I1, I2, I3, . . . , and Im that are predicted to flow through the respective series-connected modules can be calculated. In the following (Equation 8) and (Equation 9), the calculation equations of currents I1, Im are described. Currents I2, I3, . . . , and I (m−1) can be similarly calculated.

$I1=(I-((OCV1-OCV2)/R2)-((OCV1-OCV3)/R3)- \ldots -((OCV1-OCVm)/Rm))/(1+R1/R2+R1/R3++R1/Rm)$   (Equation 8)

$Im=I1*R1/Rm+((OCV1-OCVm)/Rm)$   (Equation 9)

Controller 16 sets the calculated discharging system SOP and the calculated charging system SOP to an upper limit value of the discharging power and an upper limit value of the charging power of the whole parallel system. Controller 16 may divide the calculated discharging system SOP and the calculated charging system SOP by a voltage between terminals of the whole parallel system so as to derive an upper limit value of the discharging current and an upper limit value of the charging current of the whole parallel system. The voltage between the terminals of the whole parallel system may be obtained by adding voltages of a plurality of cells connected in series. Alternately, a voltage sensor may be connected to each of both ends of the parallel system, and the voltage between the terminals of the whole parallel system may be obtained using values measured by the voltage sensors.

Controller 16 adjusts the upper limit value by multiplying the upper limit value by a coefficient α (0≤α≤1) in accordance with a condition at the time of deriving the current deviation. In this case, controller 16 sets the coefficient α such that the lower the reliability of the current deviation, the lower the coefficient α becomes.

Figure 2:
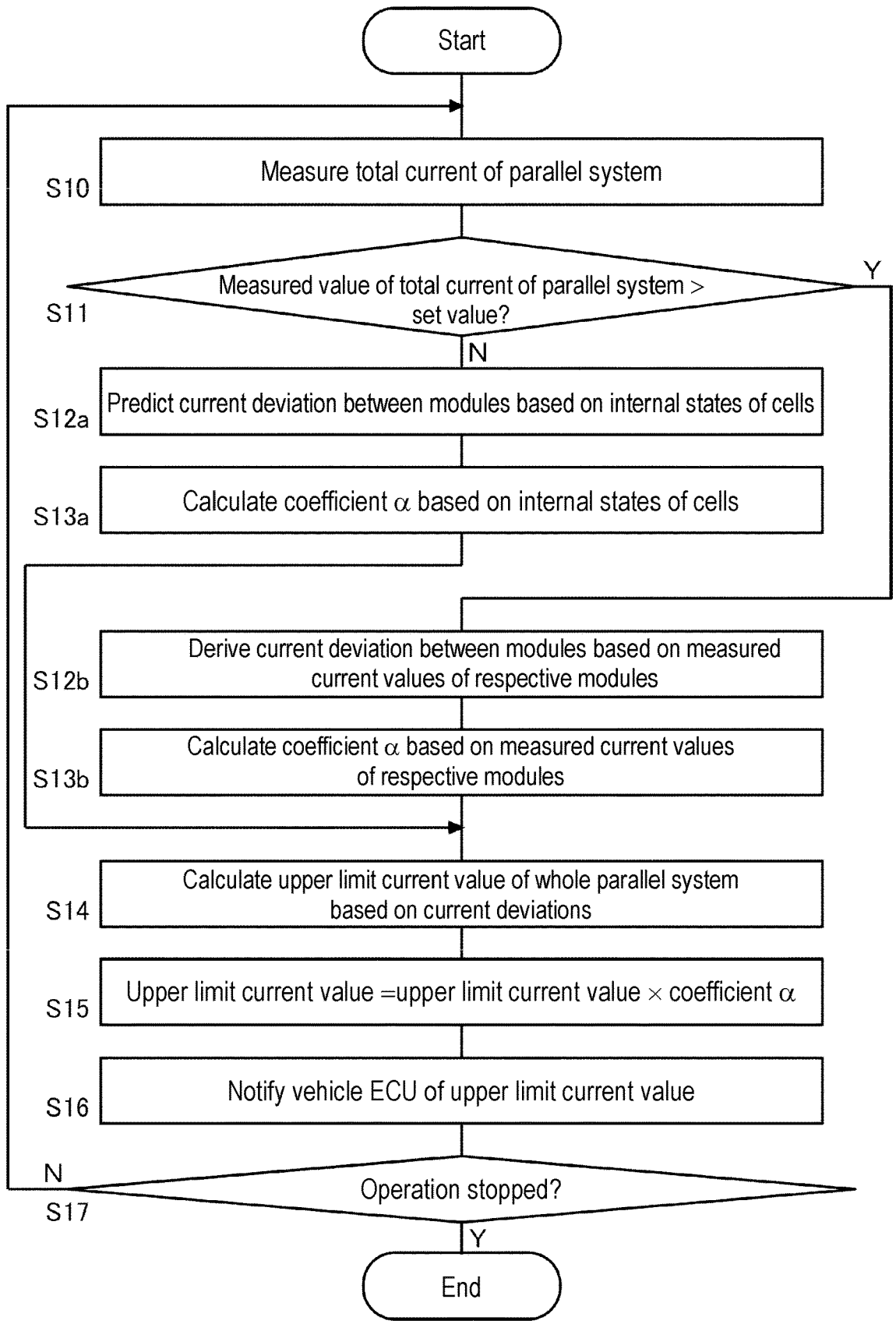
FIG. 2 is a flowchart illustrating a flow of processing for setting an upper limit current value.

FIG. 2 is a flowchart illustrating a flow of processing for setting an upper limit current value. Controller 16 measures currents flowing through the whole parallel system (S10). In a case where neither charging nor discharging is being performed, the measurement values are 0. Controller 16 compares an absolute value of a measured value of a total current of the parallel system with a predetermined set value (S11). The predetermined set value may be set to 0 A or may be set to a low current value (for example, 0.5 A). As described above, in a case where the total current is low, the influence of the measurement errors of the current sensors is increased and hence, the reliability of the derived current deviations is decreased.

When an absolute value of a measured value of the total current is less than or equal to a set value (N in S11), controller 16 derives the current deviations of the plurality of series-connected modules M1 to M3 based on the prediction from internal states of cells E11 to E1$n$, cells E21 to E2*n*, and cells E31 to E3*n* in the plurality of series-connected modules M1 to M3 (S12*a*). Controller 16 calculates a coefficient α from the internal states of cells E11 to E1*n*, cells E21 to E2*n*, and cells E31 to E3*n* in the plurality of series-connected modules M1 to M3 (S13*a*).

When the absolute value of the measured value of the total current exceeds the set value (Y in S11), controller 16 derives the current deviations of the plurality of series-connected modules M1 to M3 based on the measured current values of the plurality of series-connected modules M1 to M3 (S12*b*). Controller 16 calculates a coefficient α based on the measured current values of the plurality of series-connected modules M1 to M3 (S13*b*). As the measured current values, latest instantaneous current values may be used, or average current values within a latest predetermined time may be used. As the measured current value of the whole parallel system, a sum of the weighted current values of the plurality of series-connected modules M1 to M3 within a latest predetermined time may be used.

FIG. 3 is a diagram illustrating an example of a table used for calculation of a coefficient α in a case where the current deviation is estimated based on an internal state of the cell. FIG. 4 is a diagram illustrating an example of a table used for calculation of the coefficient α in a case where a current deviation is derived from a measured current value. In the tables illustrated in FIGS. 3 and 4, the reliability of the current deviation in the case where the current deviation is estimated based on the internal state of the cell (the prediction method being the estimation of the internal state) is 0.95, and the reliability of the current deviation in the case where the current deviation is derived based on the measured current value (the prediction method being deriving of measured current value) is 1.00. That is, the reliability of the current deviation in the case where the current deviation is estimated based on the internal state of the cell becomes lower than the reliability of the current deviation in the case where the current deviation is derived based on the measured current value.

In both prediction methods, the lower the SOH, the lower the reliability of the current deviation becomes. Controller 16 may, for example, determine the SOH of the parallel system to be an average value of the SOHs of all cells or the SOH having the minimum value among the SOHs of all cells. Further, the SOH may be determined for each series-connected module, and an average value or a minimum value of the SOHs of all series-connected modules may be determined as the SOH of the parallel system. In the examples illustrated in FIGS. 3 and 4, the reliability of the current deviation is 1.00 within a range where the SOH exceeds 90%, is 0.95 within a range where the SOH is from 80 to 90% inclusive, and is 0.90 within a range where the SOH is less than 80%.

In both prediction methods, the lower a minimum temperature, the lower the reliability of the current deviation becomes. Controller 16 may, for example, determine the minimum temperature of the parallel system to be the minimum temperature among the temperatures of all cells. Further, the average temperature for each series-connected module may be determined to be the minimum temperature among the average temperatures of all series-connected modules. In the examples illustrated in FIGS. 3 and 4, the reliability of current deviation is 1.00 within a range where the minimum temperature exceeds 5° C., is 0.90 within a range where the minimum temperature is 0° C. to 5° C., and is 0.80 within a range where the minimum temperature is less than 0° C.

In a case where the current deviation is estimated based on the internal state of the cell, the reliability of the current deviation decreases when the SOC does not fall within a predetermined range. Controller 16, for example, determines the SOC of the parallel system based on the full charge capacity of the whole parallel system and the SOCs of the respective cells. In the example illustrated in FIG. 3, the reliability of deviation is 0.95 within a range where the SOC exceeds 95% and within a range where the SOC is less than 10%, and is 1.00 within a range where the SOC is from 10 to 95% inclusive.

In a case where a current deviation is derived from a measured current value, the lower an absolute value of the measured current value, the lower the reliability of a current deviation is. In the example illustrated in FIG. 4, the reliability of the current deviation is 1.00 within a range where a measured value of a current flowing through the whole parallel system exceeds 50 A, is 0.95 in a range within a range where the measured value of the current is from 5 A to 50 A inclusive, and is 0.90 within a range where the measured value of the current is less than 5 A.

In a case where a current deviation is derived from a measured current value, the greater a change in the measured current value, the lower the reliability of the current deviation becomes. In the example illustrated in FIG. 4, the reliability of the current deviation is 0.80 within a range where a change in the measured current value exceeds 0.8, is 0.90 within a range where the measured current value is 0.5 to 0.8, and is 1.00 within a range where the measured current value is less than 0.5. An index indicating the change in the current is calculated as a minimum value/maximum value of the measured current value in the past two seconds. Accordingly, in this index, the smaller the change in the current in the past two seconds, the closer the reliability of the current deviation to 1.0, and the larger the change in the current, the closer the reliability of the current deviation to 0.0.

Hereinafter, an example of calculation of a coefficient α in a case where current deviation is estimated based on an internal state of the cell is described. In a case where a measured current value of the parallel system is 0 A (the prediction method being the estimation of the internal state), an SOH is 93%, a minimum temperature is 3° C., and an SOC is 50%, the respective reliabilities of deviation are 0.95, 0.95, 0.90, and 1.00 respectively by looking up FIG. 3. In a case where coefficient α is set to a minimum value of each reliability of deviation, coefficient α is 0.90. In a case where the coefficient α is a multiplication value of each reliability of deviation, the coefficient α is 0.81. In a case where the coefficient α is an average value of the respective reliabilities of deviations, the coefficient α is 0.95. The coefficient α may be a weighted average value of the respective reliabilities of deviations.

Next, an example of calculation of the coefficient α in a case where the current deviation is derived from a measured current value is described. In a case where a measured current value of the parallel system is 80 A, a change in a current is 0.78, an SOH is 93%, and a minimum temperature is 28° C., the reliabilities of deviation are 1.00, 0.90, 0.95, and 1.00, respectively by looking up FIG. 4. In a case where coefficient α is set to a minimum value of each reliability of deviation, coefficient α is 0.90. In a case where the coefficient α is a multiplication value of each reliability of deviation, the coefficient α is 0.86. In a case where the coefficient α is an average value of the respective reliabilities of deviations, the coefficient α is 0.96. The coefficient α may be a weighted average value of the respective reliabilities of deviations. The power source system 10 may be implemented such that a minimum value of the reliability of deviation and a multiplied value of the reliability of deviation are compared with each other, and the larger value is selected.

The parameters illustrated in FIGS. 3 and 4 are examples, and can be appropriately changed depending on an application or a system. For example, a temperature difference between series-connected modules may be used as a parameter. The reliability of current deviation is set such that the larger a temperature difference between the series-connected modules, the lower the reliability of the current deviation becomes.

In FIG. 3 and FIG. 4, the reliability of deviation is set in accordance with the conditions defined in advance in the table. However, the reliability of deviation may be set based on a reliability derivation function (model) generated by a multiple regression analysis. The reliability derivation function (model) may be updated by machine learning using actually measured current deviations as teacher data.

The description will be further made by returning to FIG. 2. Controller 16 calculates an upper limit current value of the whole parallel system based on the derived current deviations (S14). Controller 16 adjusts an upper limit current value by multiplying the calculated upper limit current value by the calculated coefficient α (S15). The higher the reliability of the current deviation, the smaller the decrease in the upper limit current value becomes. On the other hand, the lower the reliability of the current deviation, the larger the decrease in the upper limit current value becomes.

Controller 16 notifies vehicle ECU 30 of the adjusted upper limit current value via in-vehicle network 20 (S16). Vehicle ECU 30 sets the upper limit current value received from controller 16 to inverter 40. In a case where a DC/DC converter is disposed between inverter 40 and first relay RY1 and a current is controlled by the DC/DC converter, vehicle ECU 30 sets the received upper limit current value to the DC/DC converter. The inverter 40 or the DC/DC converter controls a current within a range of a set upper limit current value.

The processing in step S10 to step S16 described above are repeatedly executed during a period where power supply system 10 is in operation (N in S17).

As described above, according to the present exemplary embodiment, the lower the reliability of deviation at the time of deriving the current deviation, the more the upper limit current value of the whole parallel system is suppressed. With such a configuration, it is possible to maintain an upper limit current value of the whole parallel system as high as possible while preventing a current exceeding a maximum allowable current from flowing through respective series-connected modules. Accordingly, the power supply system can acquire both the convenience and the battery protection. The power supply system is configured such that even in an in-vehicle application where a current is likely to change rapidly, the larger a change in a current, the more an upper limit current value is suppressed. Accordingly, it is possible to prevent a current exceeding a maximum allowable current from flowing through one series-connected module.

The present disclosure has been described heretofore according to the exemplary embodiment. It will be understood by those skilled in the art that the exemplary embodiment is merely an example, other modified examples in that components and processing processes of the exemplary embodiments are variously combined are possible, and such modified examples still fall within the scope of the present disclosure.

In the above-described exemplary embodiment, the example where power supply system 10 is mounted on electric vehicle 1 to be used is described. In this respect, power supply system 10 can also be used in applications other than the in-vehicle application. For example, the present disclosure is also applicable to a stationary power storage system. In this case, a power conditioner operates a parallel system within a range of an upper limit current value. The present disclosure is also applicable to a power source for an information device such as a server, a PC, or a smartphone.

The exemplary embodiment may be also specified by the following items.

[Item 1]

A management device that manages a parallel system for power storage where a plurality of series-connected cell groups (M1 to M3) are connected in parallel, the management device including:

measurement unit (13 to 15) that measures voltages, currents, and temperatures of cells in the parallel system; and controller (16) configured to derive deviations of currents flowing through the plurality of series-connected cell groups (M1 to M3), and configured to calculate an upper limit value of a charging current or charging power of the whole parallel system or an upper limit value of a discharging current or discharging power of the whole parallel system based on the derived current deviations, wherein controller (16) is configured to adjust the upper limit value by multiplying the upper limit value by a coefficient α (0≤α≤1) in accordance with a condition at a time of deriving the current deviations.

With such a configuration, the upper limit value of the whole parallel system can be appropriately set in accordance with the condition at the time of deriving the current deviations.

[Item 2]

The management device according to Item 1, wherein controller (16) is configured to set the coefficient α such that the lower reliability of the derived current deviation, the lower the coefficient α becomes.

With such a configuration, the lower the reliability of the current deviation, the more the upper limit value can be suppressed and hence, the series-connected cell groups that form the parallel system can be protected.

[Item 3]

The management device according to Item 1, wherein controller (16) is configured to derive the current deviations from measurement values of currents flowing through the plurality of series-connected cell groups (M1 to M3) in a case where an absolute value of a measurement value of a current flowing through the whole parallel system is larger than a set value, and to derive the current deviations based on prediction from an internal state of the plurality of series-connected cell groups (M1 to M3) in a case where the absolute value of the measurement value of the current flowing through the whole of the parallel system is equal to or less than the set value, and controller (16) is configured to set the coefficient α in a case where the current deviation is derived based on the prediction from the internal state of the plurality of series-connected cell groups (M1 to M3) lower than the coefficient α in a case where the current deviation is derived from the measurement values of the currents flowing through the plurality of series-connected cell groups (M1 to M3).

With such a configuration, in the case where the current deviation is derived based on the prediction from the internal state, the upper limit value can be suppressed and hence, the series-connected cell groups that form the parallel system can be protected.

[Item 4]

The management device according to any one of Items 1 to 3, wherein
- controller (16) is configured to derive the current deviations from the measurement values of the currents flowing through the plurality of series-connected cell groups (M1 to M3), and
- controller (16) is configured to set the coefficient α such that the larger a value of a change in the measured current, the lower the coefficient α becomes.

With such a configuration, the larger the value of the change in the current, the more the upper limit value can be suppressed and hence, the series-connected cell groups that form the parallel system can be protected.

[Item 5]

The management device according to any one of Items 1 to 4, wherein
- controller (16) is configured to derive the current deviations from the measurement values of the currents flowing through the plurality of series-connected cell groups (M1 to M3), and
- controller (16) is configured to set the coefficient α such that the smaller absolute values of the measured currents, the lower the coefficient α becomes.

With such a configuration, the larger the absolute value of the measured current value, the more the upper limit value can be suppressed and hence, the series-connected cell groups that form the parallel system can be protected.

[Item 6]

The management device according to any one of Items 1 to 3, wherein
- controller (16) is configured to derive the current deviations based on prediction from internal states of the plurality of series-connected cell groups (M1 to M3), and
- controller (16) is configured to set the coefficient α such that the coefficient α is set low in a case where the states of charge (SOCs) of the plurality of series-connected cell groups (M1 to M3) do not fall within a predetermined range.

With such a configuration, in the case where the SOC ranges do not fall within the predetermined range, the upper limit value can be suppressed and hence, the series-connected cell groups that form the parallel system can be protected.

[Item 7]

The management device according to any one of Items 1 to 6, wherein controller (16) is configured to set the coefficient α such that the lower the SOH of the plurality of series-connected cell groups (M1 to M3), the lower the coefficient α becomes.

With such a configuration, the lower the SOH, the more the upper limit value can be suppressed and hence, the series-connected cell groups that form the parallel system can be protected.

[Item 8]

The management device according to any one of Items 1 to 7, wherein controller (16) is configured to set the coefficient α such that the lower the temperatures of the plurality of series-connected cell groups (M1 to M3), the lower the coefficient α becomes.

With such a configuration, the lower the temperature, the more the upper limit value can be suppressed and hence, the series-connected cell group that form the parallel system can be protected.

[Item 9]

A power supply system (10) including:
- a parallel system for power storage where a plurality of series-connected cell groups (M1 to M3) are connected in parallel; and
- the management device according to any one of Items 1 to 8 that manages the parallel system.

With such a configuration, it is possible to construct power supply system (10) where the upper limit value of the whole parallel system is appropriately set in accordance with the condition at the time of deriving the current deviation.

[Item 10]

Power supply system (10) according to Item 9, wherein
power supply system (10) is mounted on electric vehicle (1), and
the management device notifies an upper limit value to vehicle controller (16) in the electric vehicle.

With such a configuration, it is possible to construct in-vehicle power supply system (10) where the upper limit value of the whole parallel system is appropriately set in accordance with the condition at the time of deriving the current deviation.

REFERENCE MARKS IN THE DRAWING

1: electric vehicle
2: commercial power system
3: charger
4: charging cable
10: power supply system
M1 to M3: series-connected module
12: management unit
13a, 13b, 13c: voltage measurement unit
14a, 14b, 14c: temperature measurement unit
15a, 15b, 15c: current measurement unit
16: controller
E11 to E1n, E21 to E2n, E31 to E3n: cell
Rs1 to Rs3: shunt resistor
T11, T12, T21, T22, T31, T32: temperature sensor
30: vehicle ECU
40: inverter
50: motor
RY1: first relay
RY2: second relay

The invention claimed is:

1. A management device that manages a parallel system for power storage where a plurality of cell groups are connected in parallel, the plurality of cell groups each including cells connected in series, the management device comprising:
a measurement unit that measures voltages, currents, and temperatures of the cells in each of the plurality of cell groups in the parallel system; and
a controller configured to derive deviations of currents flowing through the plurality of cell groups, and configured to calculate an upper limit value based on the deviations, the upper limit value being any one of (i) an upper limit value of a charging current of the parallel system, (ii) an upper limit value of charging power of the parallel system, (iii) an upper limit value of a discharging current of the parallel system, and (iv) an upper limit value of discharging power of the parallel system, wherein the controller is configured to adjust the upper limit value by multiplying the upper limit value by a coefficient which takes between 0 and 1 inclusive in accordance with a condition at a time of deriving the deviations, the controller is configured to derive each of the deviations from a measurement value of a current flowing through a corresponding one of the plurality of cell groups when an absolute value of a measurement value of a current flowing through a whole of the parallel system is larger than a set value, and to derive each of the deviations based on prediction from an internal state of a corresponding one of the plurality of cell groups when the absolute value of the measurement value of the current flowing through the whole of the parallel system is equal to or less than the set value, and the controller is configured to set the coefficient in a case where the deviation is derived based on the prediction from the internal state lower than the coefficient in a case where the deviation is derived from the measurement value of the current.

2. The management device according to claim 1, wherein the controller is configured to derive each of the deviations from the measurement value of the current flowing through the corresponding one of the plurality of cell groups, and the controller is configured to set the coefficient lower as an absolute value of the measured current is smaller.

3. The management device according to claim 1, wherein the controller is configured to derive the deviations based on prediction from internal states of the plurality of cell groups, and the controller is configured to set the coefficient lower when states of charge (SOCs) of the plurality of cell groups do not fall within a predetermined range.

4. The management device according to claim 1, wherein the controller is configured to set the coefficient lower as states of health (SOHs) of the plurality of cell groups are lower.

5. The management device according to claim 1, wherein the controller is configured to set the coefficient lower as temperatures of the plurality of cell groups are lower.

6. A power supply system comprising:

the management device according to claim 1 that manages the parallel system; and the parallel system for power storage where a plurality of cell groups are connected in parallel.

7. The power supply system according to claim 6, wherein the power supply system is mounted on an electric vehicle, and the management device notifies the upper limit value to a vehicle controller in the electric vehicle.

8. A management device that manages a parallel system for power storage where a plurality of cell groups are connected in parallel, the plurality of cell groups each including cells connected in series, the management device comprising:

a measurement unit that measures voltages, currents, and temperatures of the cells in each of the plurality of cell groups in the parallel system; and a controller configured to derive deviations of currents flowing through the plurality of cell groups, and configured to calculate an upper limit value based on the deviations, the upper limit value being any one of (i) an upper limit value of a charging current of the parallel system, (ii) an upper limit value of charging power of the parallel system, (iii) an upper limit value of a discharging current of the parallel system, and (iv) an upper limit value of discharging power of the parallel system, wherein the controller is configured to adjust the upper limit value by multiplying the upper limit value by a coefficient which takes between 0 and 1 inclusive in accordance with a condition at a time of deriving the deviations, the controller is configured to derive the deviations from the measurement values of the currents flowing through the plurality of cell groups, and the controller is configured to set the coefficient lower as a value of a change in the measured current is larger.

9. The management device according to claim 8, wherein the controller is configured to derive each of the deviations from the measurement value of the current flowing through the corresponding one of the plurality of cell groups, and the controller is configured to set the coefficient lower as an absolute value of the measured current is smaller.

10. The management device according to claim 8, wherein the controller is configured to derive the deviations based on prediction from internal states of the plurality of cell groups, and the controller is configured to set the coefficient lower when states of charge (SOCs) of the plurality of cell groups do not fall within a predetermined range.

11. The management device according to claim 8, wherein the controller is configured to set the coefficient lower as states of health (SOHs) of the plurality of cell groups are lower.

12. The management device according to claim 8, wherein the controller is configured to set the coefficient lower as temperatures of the plurality of cell groups are lower.

13. A power supply system comprising:

the management device according to claim 4 that manages the parallel system; and the parallel system for power storage where a plurality of cell groups are connected in parallel.

14. The power supply system according to claim 13, wherein the power supply system is mounted on an electric vehicle, and the management device notifies the upper limit value to a vehicle controller in the electric vehicle.

* * * * *